US008602482B2

(12) United States Patent
Song et al.

(10) Patent No.: US 8,602,482 B2
(45) Date of Patent: Dec. 10, 2013

(54) CLOSURE ASSEMBLY AND METHOD OF MANUFACTURING SAME

(75) Inventors: Guangling Song, Troy, MI (US); Jon T. Carter, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 254 days.

(21) Appl. No.: 13/075,462

(22) Filed: Mar. 30, 2011

(65) Prior Publication Data

US 2012/0248810 A1    Oct. 4, 2012

(51) Int. Cl.
*B60J 5/00* (2006.01)

(52) U.S. Cl.
USPC ..................................... 296/146.5

(58) Field of Classification Search
USPC ........ 296/146.5; 229/190; 220/1.5; 52/309.4, 52/588.1, 239, 592.1, 480, 481.2; 160/135, 351; 206/434
See application file for complete search history.

(56) References Cited

U.S. PATENT DOCUMENTS

| | | | |
|---|---|---|---|
| 3,527,678 A | 9/1970 | Suzuki | |
| 3,680,910 A * | 8/1972 | Stanner | 296/29 |
| 3,803,014 A | 4/1974 | Atkinson | |
| 4,113,549 A * | 9/1978 | Brimm | 216/46 |
| 4,227,824 A * | 10/1980 | Ikawa | 403/271 |
| 4,679,290 A * | 7/1987 | Adell | 29/407.09 |
| 4,719,689 A * | 1/1988 | Yamamoto et al. | 29/458 |
| 4,916,284 A * | 4/1990 | Petrick | 219/121.64 |
| 5,224,253 A * | 7/1993 | Sawa | 29/243.58 |
| 5,237,734 A * | 8/1993 | Polon | 29/513 |
| 5,267,387 A * | 12/1993 | Sawa | 29/509 |
| 5,273,606 A * | 12/1993 | Greve et al. | 156/216 |
| 5,457,981 A * | 10/1995 | Brown et al. | 72/451 |
| 5,470,416 A * | 11/1995 | Herring et al. | 156/196 |
| 5,587,042 A * | 12/1996 | St. Denis | 156/477.1 |
| 5,632,413 A * | 5/1997 | Herring et al. | 222/1 |
| 5,740,691 A * | 4/1998 | Kovarovic et al. | 72/306 |
| 5,783,298 A * | 7/1998 | Herring et al. | 428/323 |
| 5,795,014 A * | 8/1998 | Balgaard | 296/210 |
| 5,897,796 A * | 4/1999 | Forrest | 219/121.64 |
| 5,948,185 A * | 9/1999 | Krajewski et al. | 148/698 |
| 5,968,849 A * | 10/1999 | Bello et al. | 438/747 |
| 6,029,334 A * | 2/2000 | Hartley | 29/464 |
| 6,257,043 B1 * | 7/2001 | Wiens | 72/412 |
| 6,368,008 B1 * | 4/2002 | Biernat et al. | 403/267 |
| 6,425,277 B2 * | 7/2002 | Wiens | 72/210 |
| 6,523,244 B1 * | 2/2003 | Bissonnette | 29/509 |
| 6,528,176 B1 * | 3/2003 | Asai et al. | 428/582 |
| 6,592,948 B1 | 7/2003 | Fusaro, Jr. et al. | |

(Continued)

FOREIGN PATENT DOCUMENTS

DE    3613853 A1    11/1987

*Primary Examiner* — Kiran B Patel
(74) *Attorney, Agent, or Firm* — Quinn Law Group, PLLC

(57) ABSTRACT

A method of manufacturing a closure assembly for a vehicle includes trimming an outer panel to define a first edge and trimming an inner panel to define a second edge, wherein the outer panel is formed from an aluminum alloy material and the inner panel is formed from a magnesium alloy material. The method further includes chemically shaping the second edge to define a substantially rounded edge surface having a radius, positioning the inner panel adjacent the outer panel such that the first edge extends beyond the substantially rounded edge surface, and bending the first edge of the outer panel around the substantially rounded edge surface of the inner panel to form a hem connection that secures the inner panel relative to the outer panel. A closure assembly is also disclosed.

9 Claims, 3 Drawing Sheets

(56) References Cited

U.S. PATENT DOCUMENTS

| | | | |
|---|---|---|---|
| 6,630,121 B1 * | 10/2003 | Sievers et al. | 424/1.13 |
| 6,672,121 B2 * | 1/2004 | Carsley et al. | 72/57 |
| 6,696,147 B1 * | 2/2004 | Herring et al. | 428/323 |
| 6,749,254 B1 * | 6/2004 | Kleven et al. | 296/191 |
| 6,865,917 B2 * | 3/2005 | Golovashchenko et al. | 72/57 |
| 6,928,848 B2 * | 8/2005 | Golovashchenko et al. | 72/322 |
| 7,007,368 B2 * | 3/2006 | Sovoda | 29/509 |
| 7,043,816 B2 * | 5/2006 | Zaluzec et al. | 29/460 |
| 7,045,195 B2 * | 5/2006 | Ozin et al. | 428/173 |
| 7,056,429 B2 | 6/2006 | Van Oirschot et al. | |
| 7,115,322 B2 * | 10/2006 | Curtiss et al. | 428/582 |
| 7,125,067 B2 | 10/2006 | Bonnett et al. | |
| 7,241,073 B2 * | 7/2007 | Miller et al. | 403/278 |
| 7,247,349 B2 * | 7/2007 | Ozin et al. | 427/283 |
| 7,422,652 B2 | 9/2008 | Ondrus et al. | |
| 7,709,057 B2 | 5/2010 | Fusaro, Jr. et al. | |
| 7,758,919 B2 * | 7/2010 | Ozin et al. | 427/240 |
| 8,015,688 B2 * | 9/2011 | Chen et al. | 29/509 |
| 8,042,372 B2 * | 10/2011 | Carsley et al. | 72/342.94 |
| 8,087,720 B2 * | 1/2012 | Wang | 296/193.11 |
| 8,114,242 B2 * | 2/2012 | Cai et al. | 156/295 |
| 8,136,323 B2 * | 3/2012 | King | 52/524 |
| 2001/0029766 A1 * | 10/2001 | Wiens | 72/312 |
| 2002/0045030 A1 * | 4/2002 | Ozin et al. | 428/173 |
| 2003/0067187 A1 * | 4/2003 | Curtiss et al. | 296/146.5 |
| 2003/0192362 A1 * | 10/2003 | Carsley et al. | 72/312 |
| 2003/0209048 A1 * | 11/2003 | Friedman et al. | 72/220 |
| 2004/0053009 A1 * | 3/2004 | Ozin et al. | 428/168 |
| 2004/0163771 A1 * | 8/2004 | Herring et al. | 156/575 |
| 2004/0245676 A1 * | 12/2004 | Zaluzec et al. | 264/294 |
| 2007/0196571 A1 * | 8/2007 | Ozin et al. | 427/199 |
| 2010/0279143 A1 * | 11/2010 | Kamat et al. | 428/615 |
| 2012/0202013 A1 * | 8/2012 | Song | 428/174 |
| 2012/0247975 A1 * | 10/2012 | Tewari et al. | 205/775.5 |
| 2012/0248811 A1 * | 10/2012 | Song et al. | 296/76 |
| 2012/0301603 A1 * | 11/2012 | Carlson et al. | 427/11 |

* cited by examiner

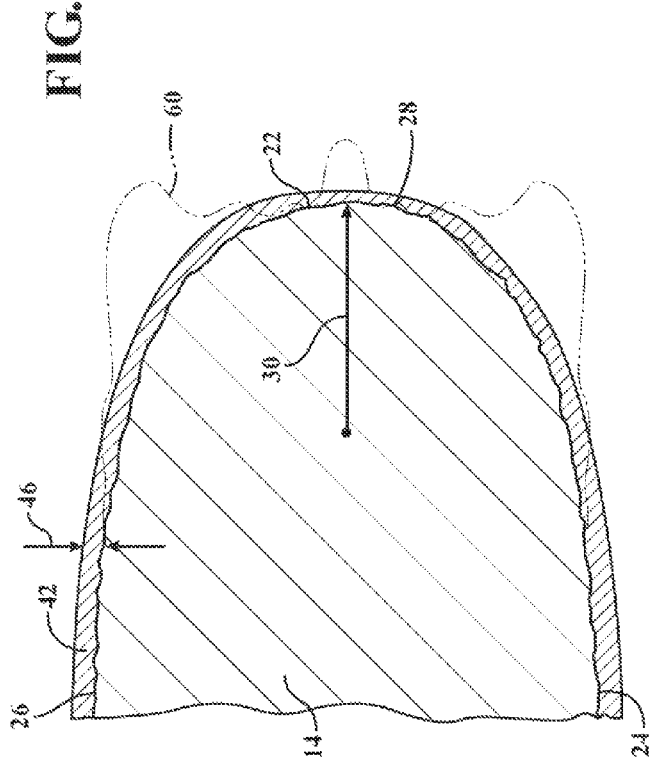
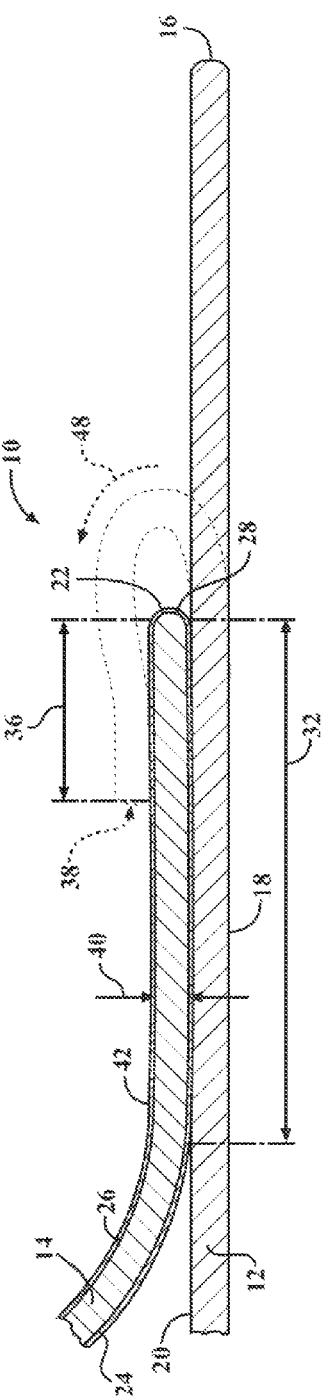

US 8,602,482 B2

CLOSURE ASSEMBLY AND METHOD OF MANUFACTURING SAME

TECHNICAL FIELD

The present disclosure generally relates to vehicle manufacturing, and more specifically, to a closure assembly for a vehicle and a method of manufacturing the closure assembly.

BACKGROUND

Closure assemblies for vehicles typically include an outer panel and an inner panel. The outer panel and the inner panel may each define an edge, e.g., a lower edge. To secure the inner panel to the outer panel, the lower edge of the outer panel may extend beyond the lower edge of the inner panel, and may be bent around and back against the inner panel to form a hem connection between the inner panel and outer panel.

To minimize vehicle weight, the inner panel may be manufactured, e.g., formed or cut, from a magnesium alloy material. Further, to minimize corrosion of the magnesium alloy material, the inner panel may be coated with a corrosion-resistant coating. However, the edge of the magnesium alloy inner panel may be jagged and/or define rough corners as a result of manufacturing processes used to trim the inner panel. Such jagged edges and/or rough corners may prevent uniform deposition of the corrosion-resistant coating on the edge of the inner panel.

SUMMARY

A method of manufacturing a closure assembly for a vehicle includes trimming an outer panel to define a first edge, wherein the outer panel is formed from an aluminum alloy material, and trimming an inner panel to define a second edge, wherein the inner panel is formed from a magnesium alloy material. The method further includes chemically shaping the second edge to define a substantially rounded edge surface having a radius. In addition, the method includes positioning the inner panel adjacent the outer panel such that the first edge extends beyond the substantially rounded edge surface, and bending the first edge of the outer panel around the substantially rounded edge surface of the inner panel to form a hem connection that secures the inner panel relative to the outer panel.

In one embodiment, the method includes electrochemically shaping the second edge to define a substantially rounded edge surface having a radius.

A closure assembly for a vehicle includes an outer panel having a first edge, and an inner panel having a second edge. The outer panel defines an exterior surface and an interior surface, and the inner panel defines a first surface and a second surface. The second edge is chemically shaped to define a substantially rounded edge surface having a radius. Further, the inner panel is positioned adjacent the outer panel such that the first surface engages the interior surface along a bondline region disposed adjacent the substantially rounded edge surface. The first edge is bent over and wrapped around the second edge such that the interior surface engages the second surface along a hem region disposed adjacent the substantially rounded edge surface to form a hem connection that secures the inner panel relative to the outer panel.

The method, in particular, chemically shaping the second edge, removes any jagged portions and/or rough corners along the second edge, and thereby allows a corrosion-resistant coating to be applied to the substantially rounded edge surface at a uniform coating thickness. Applying the corrosion-resistant coating at a uniform coating thickness along the substantially rounded edge surface improves the corrosion-resistance of the magnesium alloy inner panel. Additionally, chemically shaping the bondline region and the hem region, where the magnesium alloy material of the inner panel contacts the aluminum alloy material of the outer panel, improves adherence of the corrosion-resistant coating to the inner panel, and thereby improves the corrosion-resistance of the magnesium alloy inner panel in the bondline region and the hem region.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 3 is a schematic cross-sectional illustration of a magnified portion of a substantially rounded edge surface of the inner panel of FIG. 2;

FIG. 6 is a schematic cross-sectional illustration of the inner panel positioned adjacent the outer panel prior to bending the outer panel to define the hem connection of FIG. 2.

DETAILED DESCRIPTION

Figure 1:
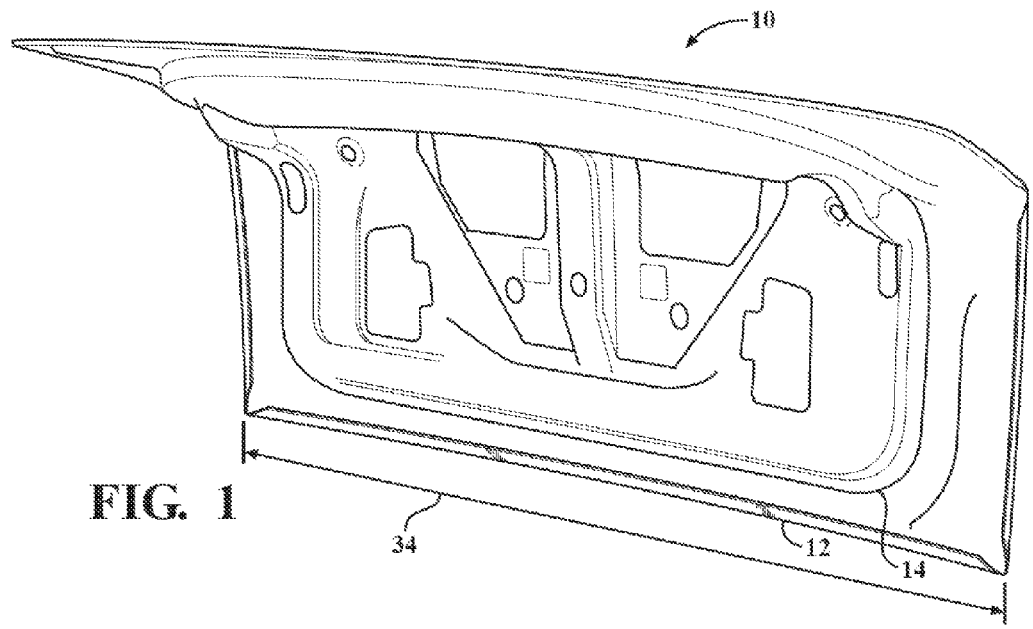
FIG. 1 is a schematic perspective illustration of a closure assembly for a trunk of a vehicle.

Referring to the Figures, wherein like reference numerals refer to like elements, a closure assembly for a vehicle is shown generally at 10 in FIG. 1. As shown, the closure assembly 10 is a trunk decklid closure assembly for a cargo trunk of a vehicle. However, it should be appreciated that the closure assembly 10 may be of any type and/or style, including, but not limited to, the trunk decklid closure assembly shown, a side driver or passenger closure assembly, a rear liftgate closure assembly, a fuel closure assembly, or a hood closure assembly. As such, the closure assembly 10 may be useful for automotive applications requiring excellent corrosion-resistance and economical manufacturing. However, the closure assembly 10 may also be useful for non-automotive applications including, but not limited to, aviation, rail, and recreational vehicle applications.

Figure 2:
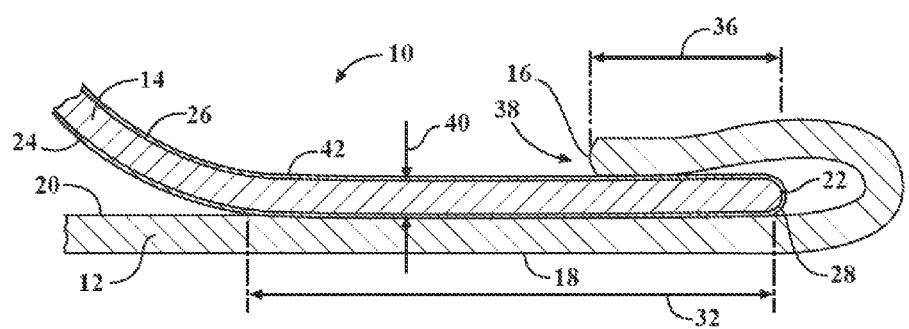
FIG. 2 is a schematic cross-sectional illustration of a hem connection between an inner panel and an outer panel of the closure assembly of FIG. 1.

Referring to FIG. 2, the closure assembly 10 includes an outer panel 12 and an inner panel 14. The outer panel 12 has a first edge 16, including, but not limited to, a lower edge or a side edge of the outer panel 12. That is, although a lower edge is referenced in FIG. 1, it should be appreciated that the first edge 16 may be disposed along any edge of the closure assembly 10, including, but not limited to, the vertical edges shown in FIG. 1. Further, the outer panel 12 defines an exterior surface 18 and an interior surface 20, and is formed from an aluminum alloy material. As used herein, the terminology "aluminum alloy material" refers to alloys in which aluminum is the predominant constituent. Other alloying constituents of the aluminum alloy material may include, for example, copper, magnesium, manganese, silicon, chromium, zinc, and lithium. A non-limiting example of a suitable aluminum alloy material is AA6111 aluminum alloy.

With continued reference to FIG. 2, the inner panel 14 has a second edge 22, including, but not limited to, a lower edge or a side edge of the inner panel 14. That is, although a lower edge is referenced in FIG. 1, it should be appreciated that the second edge 22 may be disposed along any edge of the closure assembly 10, including, but not limited to, the vertical edges shown in FIG. 1. The inner panel 14 defines a first surface 24 and a second surface 26, and is formed from a magnesium alloy material. As used herein, the terminology "magnesium alloy material" refers to alloys in which magnesium is the predominant constituent. Other alloying constituents of the magnesium alloy material may include, for example, copper, aluminum, manganese, silicon, zinc, and zirconium. A non-limiting example of a suitable magnesium alloy material is AZ31B magnesium alloy.

Referring now to FIG. 3, the second edge 22 is chemically shaped from an initial shape 60 shown in phantom in FIG. 3 to define a substantially rounded edge surface 28 having a radius 30, as set forth in more detail below. As used herein, the terminology "substantially rounded edge surface 28" refers to a substantially smooth edge 28 that is substantially free from jagged portions and/or rough corners or surfaces.

As best shown in FIG. 2, the inner panel 14 is positioned adjacent the outer panel 12 such that the first surface 24 engages the interior surface 20 along a bondline region 32. The bondline region 32 is disposed adjacent the substantially rounded edge surface 28 and may extend along a length 34 (FIG. 1) of the closure assembly 10. An adhesive (not shown) may optionally be applied to the interior surface 20 before the inner panel 14 is positioned adjacent the outer panel 12. The first edge 16 is bent over and wrapped around the second edge 22 such that the interior surface 20 engages the second surface 26 along a hem region 36. As such, the optional adhesive may be sandwiched between the inner panel 14 and the outer panel 12 and flow to adhere the inner panel 14 to the outer panel 12 along the bondline region 32. The hem region 36 is disposed adjacent the substantially rounded edge surface 28 to form a hem connection 38 that secures the inner panel 14 relative to the outer panel 12. The hem region 36 may also extend along the length 34 and/or side edges of the closure assembly 10, as shown in FIG. 1. Therefore, the bondline region 32 and the hem region 36 refer to the regions of the magnesium alloy inner panel 14 that contact the aluminum alloy outer panel 12 when assembled in place.

Referring now to FIGS. 2 and 3, the inner panel 14 may have a thickness 40 (FIG. 2), and the radius 30 (FIG. 3) may be equal to from about one quarter (¼) of the thickness 40 to about one half (½) of the thickness 40 of the inner panel 14. For example, the radius 30 may be equal to about one third (⅓) of the thickness 40 of the inner panel 14. In another non-limiting example, the radius 30 may be equal to about one half (½) the thickness 40 of the inner panel 14 so as to define a semicircular substantially rounded edge surface 28. It should be appreciated that the radius 30 of the substantially rounded edge surface 28 may not be exactly uniform along the length 34 (FIG. 1) of the closure assembly 10, but may rather vary between a range including about one quarter (¼) to about one half (½) of the thickness 40 of the inner panel 14.

With continued reference to FIG. 2, a radius 30 (FIG. 3) of greater than one half (½) of the thickness 40 of the inner panel 14 may create an undesirable sharp corner (not shown) at an intersection between the first surface 24 of the inner panel 14 and the substantially rounded edge surface 28, as well as between the second surface 26 of the inner panel 14 and the substantially rounded edge surface 28. It has been discovered that jagged portions and/or sharp corners, e.g., as shown in the initial shape 60 of FIG. 3, along the second edge 22 of the inner panel 14 may prevent uniform deposition of a corrosion-resistant coating 42 (best shown in FIG. 3), which may in turn lead to corrosion of the inner panel 14 along the second edge 22. The substantially rounded edge surface 28 of the inner panel 14 minimizes any jagged portions and/or sharp corners that may have resulted from trimming of the inner panel 14. For example, the jagged portions and/or sharp corners may be initially introduced by piercing a piece of sheet metal or cutting the piece of sheet metal with shears. Minimizing or eliminating the jagged portions and/or sharp corners allows for uniform deposition of the corrosion-resistant coating 42, and thereby provides the inner panel 14 with excellent corrosion-resistance, as set forth in more detail below.

A method of manufacturing the closure assembly 10 of FIG. 1 is described with reference to the Figures. While the method describes the manufacture of the closure assembly 10 as shown in FIG. 1, it should be appreciated that the method may alternatively be used to manufacture any panel for the vehicle, including, but not limited to, deck lids, body panels, etc.

Referring again to FIG. 2, the method includes trimming the outer panel 12 to define the first edge 16, wherein the outer panel 12 is formed from the aluminum alloy material. The outer panel 12 may be trimmed via any suitable trimming process. For example, the outer panel 12 may be pierced and/or cut from sheet metal to define the first edge 16 as described above.

With continued reference to FIG. 2, the method also includes trimming the inner panel 14 to define the second edge 22, wherein the inner panel 14 is formed from the magnesium alloy material. Similarly, the inner panel 14 may be trimmed via any suitable trimming process. For example, the inner panel 14 may also be pierced and/or cut from sheet metal to define the second edge 22, as described above. Therefore, the second edge 22 may be characterized as comparatively rougher than the substantially rounded edge surface 28, and may be jagged and/or include rough corners, e.g., as shown in the initial shape 60 of FIG. 3.

Figure 4:
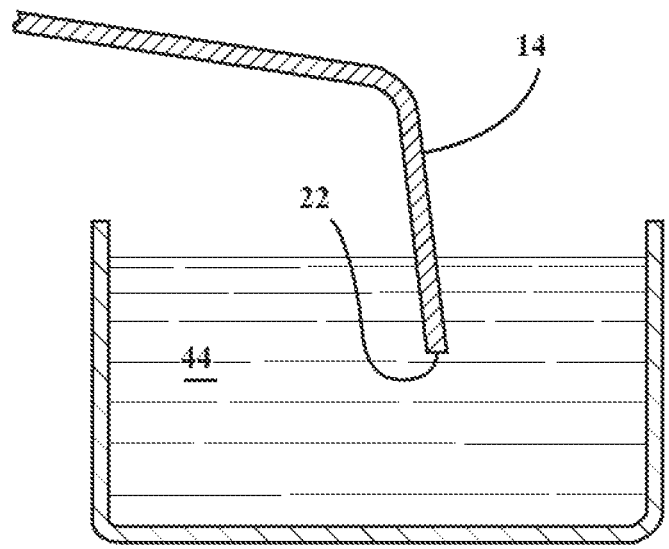
FIG. 4 is a schematic cross-sectional illustration of chemically shaping the inner panel of FIG. 2 to define the substantially rounded edge surface of FIG. 3.

Referring now to FIGS. 3 and 4, the method includes chemically shaping the second edge 22 to define the substantially rounded edge surface 28 (FIG. 3) having the radius 30 (FIG. 3). That is, rather than abrasively shaping the second edge 22 with a mechanical process such as, for example, sanding, the method includes chemically shaping the second edge 22. More specifically, chemically shaping may include contacting the second edge 22 with a polishing solution 44 (FIG. 4) to round the second edge 22 and define the radius 30. Suitable polishing solutions 44 may include any material capable of chemically reacting with the magnesium alloy material of the inner panel 14. For example, the polishing solution 44 may be an electrolyte or acid that includes magnesium inhibitors capable of desorbing from solution. Therefore, chemically shaping the second edge 22 may include contacting the second edge 22 with an acid to etch and smooth the second edge 22. Suitable specific examples of the polishing solution 44 may include peroxy(mono)phosphoric acid, phosphoric acid, chromic-nitric-hydrofluoric acid, nitric acid, and combinations thereof.

The second edge 22 may contact the polishing solution 44 in any manner. For example, the polishing solution 44 may be wiped, sprayed, or coated onto the second edge 22. Alternatively, as shown in FIG. 4, chemical shaping may include dipping the second edge 22 in phosphoric acid. That is, the second edge 22 may be dipped and/or immersed in the polishing solution 44 for from about 1 minute to about 3 minutes to thereby etch away the jagged portions or sharp second edge 22 of the inner panel 14. Stated differently, chemical shaping may smooth and round the second edge 22 to define the substantially rounded edge surface 28 (FIG. 3) having the radius 30 (FIG. 3).

With continued reference to FIGS. 2 and 4, the method may further include chemically finishing the bondline region 32 (FIG. 2) and the hem region 36 (FIG. 2) of the inner panel 14. That is, chemically finishing may include contacting the bondline region 32 and the hem region 36 with the polishing solution 44 (FIG. 4) to etch and smooth the bondline region 32 and the hem region 36. It is to be appreciated that chemically finishing may also include contacting a portion of the inner panel 14 that extends beyond the bondline region 32 with the polishing solution 44. Chemically finishing may include dipping the bondline region 32 and the hem region 36 in the polishing solution 44, e.g., phosphoric acid, for from about 1 minute to about 3 minutes to thereby etch away any jagged or sharp portions of the first and second surfaces 24, 26 of the inner panel 14. That is, chemically finishing may smooth the bondline region 32 and hem region 36. Chemically finishing the bondline region 32 and the hem region 36 of the inner panel 14 may also remove surface contaminants, and allow for better adhesion of the corrosion-resistant coating 42 (FIG. 2) to the magnesium alloy material of the inner panel 14.

Referring again to FIGS. 2, 3, and 6, the method may also include, after chemically shaping the second edge 22, and optionally, after chemically finishing the bondline region 32 and the hem region 36, disposing the corrosion-resistant coating 42 on the inner panel 14. That is, as best shown in FIG. 2, the corrosion-resistant coating 42 may be disposed on each of the first surface 24, including the bondline region 32, the second surface 26, including the hem region 36, and the substantially rounded edge surface 28. The corrosion-resistant coating 42 may include any suitable coating composition capable of minimizing corrosion of the magnesium alloy material. For example, the corrosion-resistant coating 42 may be selected from, but not limited to, residual surface cleaning agents, conversion coatings, anodization coatings, electrodeposition coatings (e-coatings), powder coatings, primer coatings, basecoat coatings, topcoat coatings, clearcoat coatings, and combinations thereof. In one non-limiting example, the corrosion-resistant coating 42 may include an electro-deposition coating that is applied to automotive body panels. The corrosion-resistant coating 42 may be applied in any manner suitable for the application of the specific corrosion-resistant coating 42. For example, the inner panel 14 may be coated by, dipped in, sprayed with, and/or submerged in the corrosion-resistant coating 42. In the non-limiting example wherein the corrosion resistant coating 42 is an electro-deposition coating, then the corrosion-resistant coating 42 may be applied through an electro-deposition coating process whereby the inner panel 14 is submerged in a bath of the electro-deposition coating and an electric charge attracts the electro-deposition coating to the inner panel 14.

As best shown in FIG. 3, the corrosion-resistant coating 42 has the coating thickness 46 that is substantially uniform along the substantially rounded edge surface 28. That is, since the substantially rounded edge surface 28 is chemically shaped, the substantially rounded edge surface 28 may be substantially free from jagged portions and/or rough corners. As such, the coating thickness 46 is substantially uniform along the substantially rounded edge surface 28.

Referring now to FIG. 6, the method also includes positioning the inner panel 14 adjacent the outer panel 12 such that the first edge 16 extends beyond the substantially rounded edge surface 28. That is, as shown in FIG. 6, the first edge 16 may overhang the substantially rounded edge surface 28 that is defined by the aforementioned chemical shaping. In addition, the method includes bending the first edge 16 of the outer panel 12 around the substantially rounded edge surface 28 of the inner panel 14, in a direction indicated by arrow 48 in FIG. 6, to form the hem connection 38 (best shown in FIG. 2) that secures the inner panel 14 relative to the outer panel 12. That is, the first edge 16 is bent around the substantially rounded edge surface 28, as indicated by arrow 48, until the interior surface 20 is adjacent and engages the second surface 26 of the inner panel 14 (which may be coated with the corrosion-resistant coating 42), as shown in phantom in FIG. 6 and in a final shape in FIG. 2, to form the hem connection 38 that secures the inner panel 14 relative to the outer panel 12.

In another embodiment, as described with reference to FIG. 5, the method includes electrochemically shaping the second edge 22 to define the substantially rounded edge surface 28 (FIG. 3) having the radius 30 (FIG. 3). That is, in this embodiment, the method may include chemically shaping the second edge 22 while simultaneously applying an electrical current (denoted generally at 50 in FIG. 5) to the inner panel 14.

Figure 5:
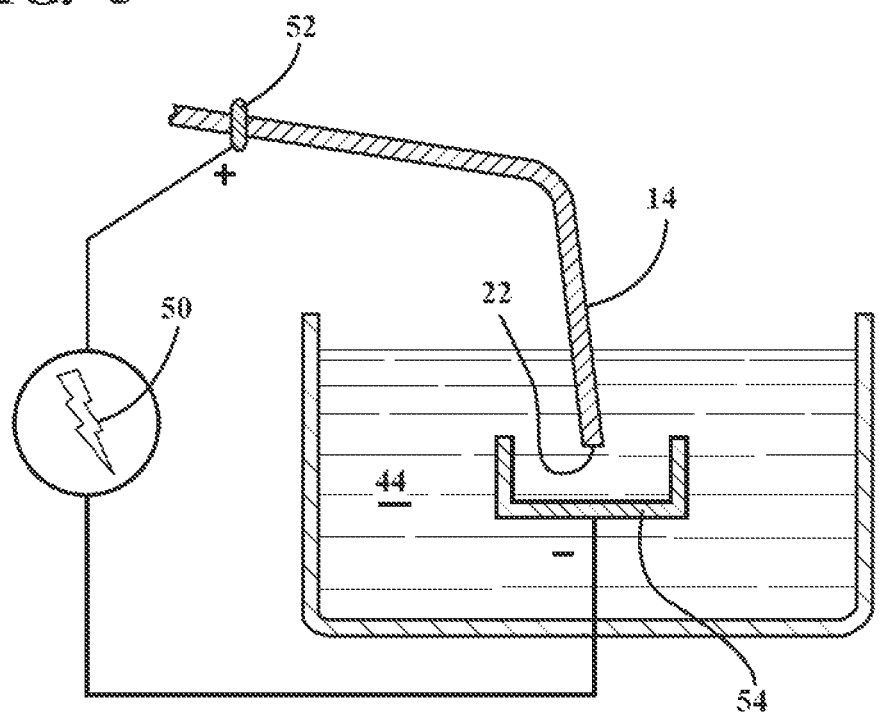
FIG. 5 is a schematic cross-sectional illustration of electrochemically shaping the inner panel of FIG. 2 to define the substantially rounded edge surface of FIG. 3.

For example, as best shown in FIG. 5, electrochemically shaping may include applying the electrical current 50 across a plurality of electrodes 52, 54 each disposed adjacent the inner panel 14 to allow flow of the electrical current 50 to the second edge 22. More specifically, one 52 of the plurality of electrodes, e.g., a positive electrode 52, may be disposed adjacent and in contact with the inner panel 14 and another 54 of the plurality of electrodes, e.g., a negative electrode 54, may be specifically disposed adjacent the second edge 22 of the inner panel 14.

Further, referring to FIG. 5, electrochemically shaping may include contacting the second edge 22 with the polishing solution 44 to round the second edge 22 and define the radius 30 (FIG. 3). That is, the electrical current 50 may be applied across the plurality of electrodes 52, 54 while the polishing solution 44 contacts the second edge 22. As such, rather than abrasively shaping the second edge 22 with a mechanical process such as, for example, sanding, the method includes electrochemically shaping the second edge 22.

In one non-limiting variation, as described with reference to FIG. 5, applying the electric current 50 may include surrounding the second edge 22 with one 54 of the plurality of electrodes. That is, the electrode 54 may be shaped or tailored to conform to the general contours of the second edge 22. For example, as shown in FIG. 5, one 54 of the plurality of electrodes may have a U-shape and surround the second edge 22. Without intending to be limited by theory, the aforementioned tailored shape of the electrode 54 may accelerate dissolution at the second edge 22 to thereby control the resulting coating thickness 46 (FIG. 3) of the corrosion-resistant coating 42 (FIG. 3).

The electrical current 50 may be applied across the plurality of electrodes 52, 54 at a voltage dependent upon a conductivity of the polishing solution 44 and a distance between the plurality of electrodes 52, 54. In general, however, the higher the conductivity of the polishing solution 44 and the shorter the distance between the plurality of electrodes 52, 54, the lower the voltage requirement.

With continued reference to FIG. 5, electrochemically shaping the second edge 22 may include contacting the second edge 22 with the polishing solution 44, e.g., an acid, to etch and smooth the second edge 22. The second edge 22 may contact the polishing solution 44 in any manner. For example, the polishing solution 44 or acid may be wiped, sprayed, or coated onto the second edge 22. Alternatively, as shown in FIG. 5, electrochemically shaping may include dipping the second edge 22 in the polishing solution 44, e.g., phosphoric acid. That is, the second edge 22 may be dipped and/or immersed in the polishing solution 44 for from about 1 minute to about 3 minutes to thereby etch away the jagged portions and/or sharp corners of the second edge 22 of the inner panel 14. Stated differently, electrochemically shaping may smooth and round the second edge 22 to define the substantially rounded edge surface 28 (FIG. 3) having the radius 30 (FIG. 3).

With continued reference to FIGS. 2 and 5, the method may further include electrochemically finishing the bondline region 32 (FIG. 2) and the hem region 36 (FIG. 2) of the inner panel 14. That is, electrochemically finishing may include contacting each of the bondline region 32 and the hem region 36 with the polishing solution 44 (FIG. 5) to etch and smooth the bondline region 32 and the hem region 36. It is to be appreciated that electrochemically finishing may also include contacting a portion of the inner panel 14 that extends beyond the bondline region 32 with the polishing solution 44. Electrochemically finishing may include, simultaneous to applying the electrical current 50, dipping the bondline region 32 and the hem region 36 in the polishing solution 44, e.g., phosphoric acid, for from about 1 minute to about 3 minutes to thereby etch away any jagged portions and/or sharp corners or surfaces 24, 26 of the inner panel 14. That is, electrochemically finishing may smooth the bondline region 32 and hem region 36. Electrochemically finishing the bondline region 32 and the hem region 36 of the inner panel 14 may also remove surface contaminants, and allow for better adhesion of the corrosion-resistant coating 42 to the magnesium alloy material of the inner panel 14.

Referring again to FIGS. 2, 3, and 6, the method may also include, after electrochemically finishing, disposing the corrosion-resistant coating 42 on the inner panel 14. That is, the corrosion-resistant coating 42 may be disposed on each of the first surface 24, including the bondline region 32, the second surface 26, including the hem region 36, and the substantially rounded edge surface 28.

As best shown in FIG. 3, the corrosion-resistant coating 42 has the coating thickness 46 that is substantially uniform along the substantially rounded edge surface 28. That is, since the substantially rounded edge surface 28 is electrochemically shaped, the substantially rounded edge surface 28 may be substantially free from jagged portions and/or rough corners. As such, the coating thickness 46 is substantially uniform along the substantially rounded edge surface 28.

Electrochemically shaping the second edge 22 and/or electrochemically finishing the bondline region 32 and the hem region 36 of the inner panel 14 not only contributes to improved corrosion-resistance of the closure assembly 10 by promoting uniform coating thickness 46 of the corrosion-resistant coating 42 along the substantially rounded edge surface 28, but also enhances the corrosion-resistance of the magnesium alloy material itself, for example, by removing contaminants and/or inhomogeneities. Further, chemically or electrochemically shaping the second edge 22 to define the substantially rounded edge surface 28 of the magnesium alloy inner panel 14 removes any jagged portions and/or rough corners along the second edge 22, and thereby allows the corrosion-resistant coating 42 to be applied to the substantially rounded edge surface 28 at the uniform coating thickness 46. Applying the corrosion-resistant coating 42 at the uniform coating thickness 46 along the substantially rounded edge surface 28 improves the corrosion-resistance of the magnesium alloy inner panel 14. Additionally, chemically or electrochemically finishing the bondline region 32 and the hem region 36, where the magnesium alloy material of the inner panel 14 contacts the aluminum alloy material of the outer panel 12, improves adherence of the corrosion-resistant coating 42 to the magnesium alloy inner panel 14, and thereby improves the corrosion-resistance of the magnesium alloy inner panel 14 in the bondline region 32 and the hem region 36.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of manufacturing a closure assembly for a vehicle, the method comprising:
   trimming an outer panel to define a first edge, wherein the outer panel is formed from an aluminum alloy material;
   trimming an inner panel to define a second edge, wherein the inner panel is formed from a magnesium alloy material;
   chemically shaping the second edge to define a substantially rounded edge surface having a radius;
   positioning the inner panel adjacent the outer panel such that the first edge extends beyond the substantially rounded edge surface; and
   bending the first edge of the outer panel around the substantially rounded edge surface of the inner panel to form a hem connection that secures the inner panel relative to the outer panel.

2. The method of claim 1, wherein the inner panel has a thickness, and wherein the radius is equal to from about one quarter of the thickness to about one half of the thickness of the inner panel.

3. The method of claim 2, wherein chemically shaping includes contacting the second edge with a polishing solution to round the second edge and define the radius.

4. The method of claim 3, wherein chemically shaping includes contacting the second edge with an acid to etch and smooth the second edge.

5. The method of claim 4, wherein chemically shaping includes dipping the second edge in phosphoric acid.

6. The method of claim 2, wherein the inner panel further defines a first surface having a bondline region disposed adjacent the substantially rounded edge surface and a second surface having a hem region disposed adjacent the substantially rounded edge surface, and wherein the method further includes chemically finishing the bondline region and the hem region of the inner panel.

7. The method of claim 6, wherein chemically finishing includes contacting the bondline region and the hem region with a polishing solution to etch and smooth the bondline region and the hem region.

8. The method of claim 7, wherein chemically finishing includes dipping the bondline region and the hem region in the polishing solution for from about 1 minute to about 3 minutes.

9. The method of claim 1, further including, after chemically shaping, disposing a corrosion-resistant coating on the inner panel, wherein the corrosion-resistant coating has a coating thickness that is substantially uniform along the substantially rounded edge surface.

* * * * *